(12) United States Patent
Barkan et al.

(10) Patent No.: US 6,612,496 B1
(45) Date of Patent: Sep. 2, 2003

(54) SCAN MODULE

(75) Inventors: Edward Barkan, Miller Place, NY (US); Howard Shepard, Great River, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/526,839

(22) Filed: Mar. 16, 2000

(51) Int. Cl.$^7$ ................................................ G06K 7/10
(52) U.S. Cl. ........................ 235/462.22; 235/462.23; 235/462.32; 235/462.45; 235/454
(58) Field of Search ..................... 235/462.45, 462.23, 235/454, 462.32, 472.01, 462.22

(56) References Cited

U.S. PATENT DOCUMENTS

| 4,570,057 A | * | 2/1986 | Chadima et al. | 235/462.45 |
| 5,367,151 A | | 11/1994 | Dvorkis et al. | 235/472 |
| 5,479,000 A | | 12/1995 | Dvorkis et al. | 235/472 |
| 5,506,394 A | | 4/1996 | Plesko | 235/472 |
| 5,581,067 A | | 12/1996 | Grosfeld et al. | 235/462 |
| 5,581,068 A | * | 12/1996 | Shepard et al. | 235/462.45 |
| 5,629,510 A | | 5/1997 | Quinn et al. | 235/462 |
| 5,693,929 A | | 12/1997 | Dvorkis et al. | 235/454 |
| 5,747,823 A | * | 5/1998 | Ishitsuka et al. | 235/494 |
| 5,763,863 A | | 6/1998 | Grosfeld et al. | 235/462 |
| 5,778,133 A | | 7/1998 | Plesko | 385/146 |
| 5,874,720 A | | 2/1999 | Dvorkis et al. | 235/467 |
| 5,988,502 A | * | 11/1999 | Krichever et al. | 235/454 |
| 6,112,992 A | * | 9/2000 | Agabra et al. | 235/472.01 |
| 6,415,981 B1 | * | 7/2002 | Itou | 235/472.01 |

FOREIGN PATENT DOCUMENTS

WO     WO 98/12660     3/1998

OTHER PUBLICATIONS

Symbol—SE–900–100A Scan Engine Integration Guide—Revision A—Apr. 1998.

* cited by examiner

Primary Examiner—Michael G. Lee
Assistant Examiner—Ahshik Kim
(74) Attorney, Agent, or Firm—Kirschstein, et al.

(57) ABSTRACT

A non-retroreflective axial scan module has a light source for producing a light beam directed, a scan element disposed receptive of the light beam to provide a scanning light beam, a photodetector for receiving light from the scanning beam reflected by a dataform for producing a signal corresponding thereto and optics for restricting the field of view of the photodetector to the vicinity of a scan line formed by the scanning light beam on the dataform all supported in a housing having a volume of less than about one cubic inch.

57 Claims, 6 Drawing Sheets

SCAN MODULE

BACKGROUND OF THE INVENTION

The present invention relates to the field of beam scanning, and in particular, to the use of scan modules for scanning and/or reading dataforms such as bar codes.

Two types of scan modules which scan bar codes and detect light reflected therefrom are retroreflective and non-retroreflective scan modules. An example of a retroreflective scan module is disclosed in U.S. application Ser. No. 09/275,858, filed Mar. 24, 1999, the disclosure of which is incorporated herein by reference.

A non-retroreflective axial scan module is disclosed in U.S. Pat. No. 5,506,394, the disclosure of which is incorporated herein by reference. The scan element used in the non-retroreflective scan module in the '394 patent is a so-called axial scanner, for example, wherein a light source, such as a laser diode, produces a beam directed along an axis and a movable scan element is disposed along the axis and receives the beam to provide a scanning light beam directed generally along the axis. This provides for a scan engine or module having a narrow width.

Retroreflective and non-retroreflective scan modules are also known wherein the scanning is not axial, but rather a beam from a laser diode is projected in a direction normal to the outgoing scanning beam prior to being applied to a movable scanning element.

The non-retroreflective scan module disclosed in the '394 patent has a number of disadvantages, in particular, the photodetector therein is not capable of receiving light reflected from a bar code without also receiving a considerable amount of noise caused by ambient light.

SUMMARY OF THE INVENTION

One object of the present invention is to provide an improvement in an axial non-retroreflective scan module wherein optics are provided to restrict the field of view of the photodetector to the vicinity of a scan line formed by the scan element.

Like an imaging system, a non-imaging collector such as the one disclosed in U.S. Pat. No. 5,778,133 increases signal, but unlike an imaging system, it does nothing to decrease the field of view. In fact, non-imaging collectors are generally used where large fields of view are desired. They are therefore a poor choice for a single line scanner. The collection system of the present invention increases signal and reduces field of view.

Another object of the present invention is to provide a pen scanner which comprises a pen housing with a writing element at one end and a non-retroreflective scan module mounted in the pen housing to emit the scanning light beam from the other end. The pen scanner is preferably self-contained and has a power source in the pen housing which can comprise a rechargeable or replaceable battery, power management circuitry, signal processing and decoding circuitry and communications circuitry to output data from the device. The communications circuitry is preferably wireless and can use the laser light source itself, a radio frequency transmitter or a light emitting diode.

A further object of the present invention is to utilize the non-retroreflective scan-module in a keychain scanner or a pendant scanner configuration.

A still further object of the present invention is to provide a scan module of either the non-retroreflective or retroreflective type and of either the axial and non-axial type, wherein the housing thereof comprises a block mounting a light source, scan element, photodetector and optics and wherein the block is mountable on a printed circuit board having signal processing and decoding circuitry thereon to output a signal from the photodetector to the signal processing and decoding circuitry. Alternatively, the photodetector can be mounted on the motherboard, with the block carrying the optical filter and photodiode aperture. In this case, the block carries the laser with its focusing optics, the scan motor and the collection optics (if used). It can also carry the optical filter for the photodiode and an aperture that the photodiode receives light through. The block retains all optical components in proper alignment.

The printed circuit board may be a motherboard for another device which utilizes a scanning input. For example, the motherboard can be a printed circuit board for a personal digital assistant, a cell phone or any other electronic device which may also require a scanning capability. In this way, the circuitry for the scan module is already provided on the circuit board and one need only mount the block with the aforesaid scanner elements thereon to scan and decode bar codes and the like.

Another object of the present invention is to provide a mounting assembly for a non-retroreflective scan module, so that it can be easily and removeably mounted in a device housing or the like.

Still another object of the present invention is to provide an improvement in an axial non-retroreflective scan module wherein the laser is pulsed at a frequency to enable the electronics to distinguish between signal and noise.

These and other objects and advantages of the present invention will be achieved in accordance with the present invention as disclosed in the following description when read in conjunction with the attached drawings, wherein:

DETAILED DESCRIPTION OF THE INVENTION

Figure 1A:
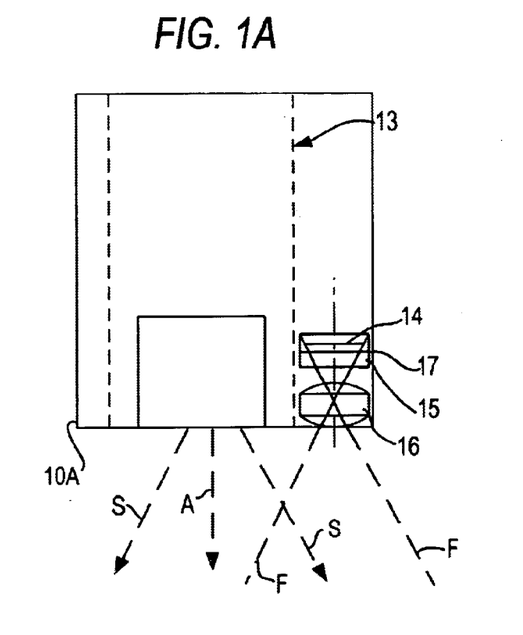
FIGS. 1A–1C are top, front and side views of a scan module according to the present invention.
Figure 1B:
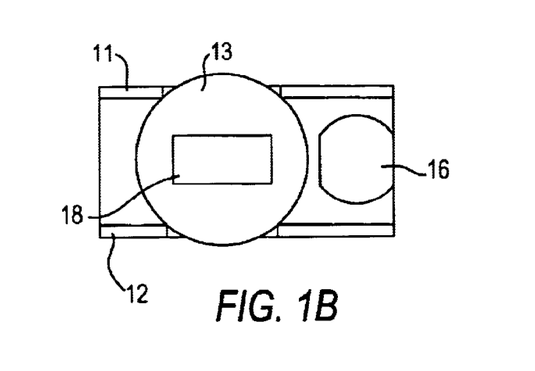
Figure 1C:
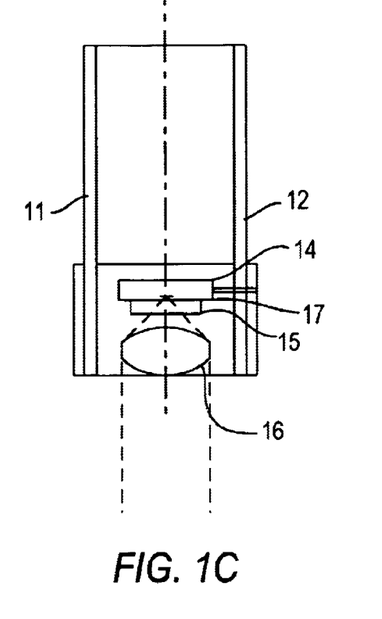

Referring now to FIGS. 1A–1C, a first embodiment of a scan module 10A according to the present is shown. In this embodiment, a laser focus and scan mirror drive assembly 13 is disposed between two printed circuit boards 11 and 12. Alternatively, one board can be used with all of the circuitry thereon. The laser focus and scan-mirror drive assembly is the axial non-retroreflective assembly disclosed, for example, in U.S. Pat. No. 5,506,394. The assembly produces a beam along axis A which is then scanned through a window 18 between lines S—S, as shown in FIG. 1A.

In order to detect light reflected from a dataform, such as a bar code, a photodetector 14 is provided. In order to restrict the field of view F—F of the photodetector, a collection lens 16 is disposed along one side of the module and the photodetector is recessed back behind the collection lens as shown. Disposed between the lens 16 and the photodetector 14 is a filter 15 for filtering out wavelengths other than those of the laser diode in assembly 13 and optionally, a slit aperture 17 which is configured to be long and narrow and aligned with the image of the scan line on a dataform as imaged by lens 16 onto photodetector 14. The filter can be between the lens and symbol if desired, but it will be larger and more expensive. The slit size is dependent upon the geometry of the system. In this way, the field of view of the photodetector 14 is limited to the vicinity of the scan line on the bar code and the photodetector can therefore be larger than the image of the scan line.

Alternatively, the photodetector 14, such as a photodiode, itself can be long and thin and thereby have a width matching the scan line image, as is shown in FIG. 1C. The photodiode surface size is also dictated by the geometry of the system. In this embodiment, the slit aperture is optional. Although FIGS. 1A–1C illustrate the photodiode and lens on one side of the assembly 13, it can also be mounted on the other side or above or below the assembly 13. Alternatively, two photodiodes can be used with one on either side of the assembly or above and below the assembly If the lens and detector are above or below the plane of the scanned laser the images on the detector will move up and down on the detector as the symbol is moved closer or further away, due to parallax. In this case, the photodiode aperture has to be enlarged in the vertical direction, or the laser will be out of view at some distances. Enlarging the aperture (or shape of the photodiode) increases field of view, decreasing ambient light immunity. This is still better than a bare photodiode.

Figure 2A:
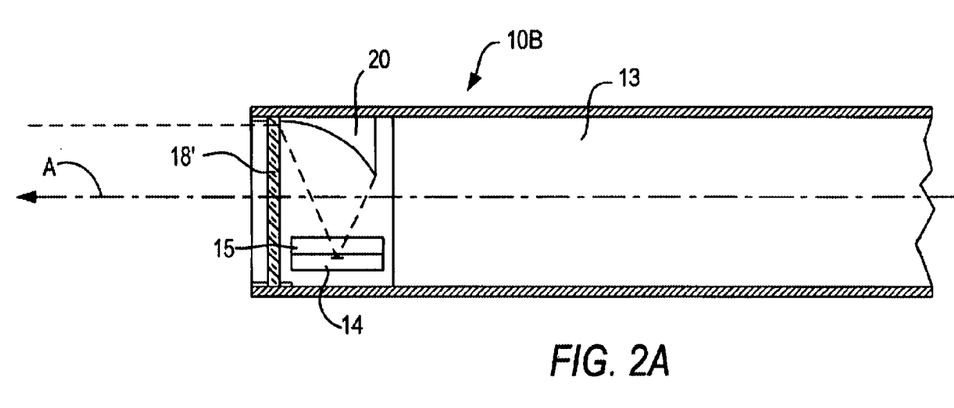
FIGS. 2A–2C are side, front and top views of another embodiment of a scan module according to the present invention.
Figure 2B:
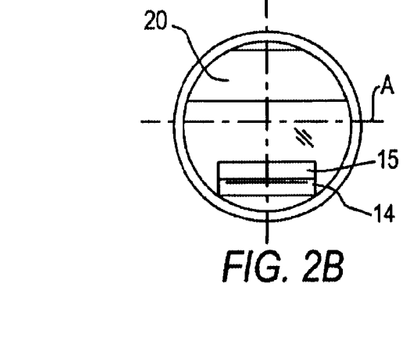
Figure 2C:
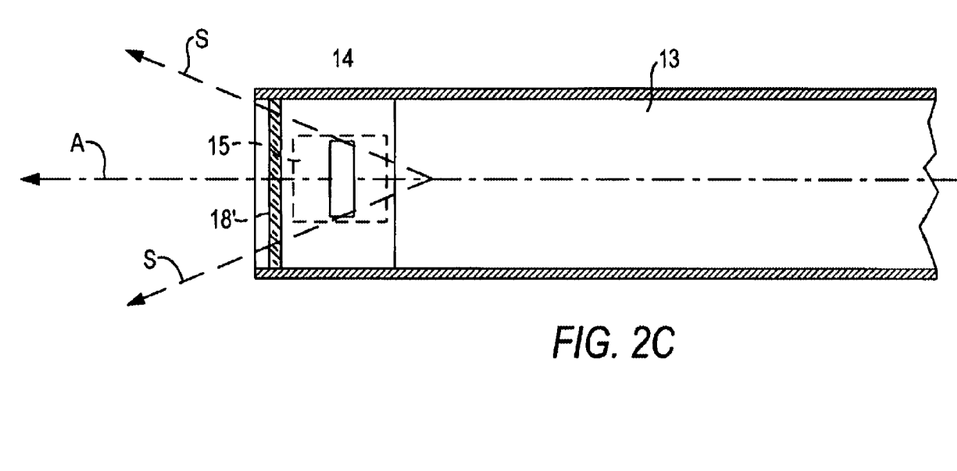

FIGS. 2A–2C illustrate another embodiment 10B of the present invention wherein the photodetector 14 is disposed so that its surface is parallel to the scan axis A and to the plane of the scan beam and it is disposed between the assembly 13 and window 18' as shown. In order to direct light reflected from a bar code to the photodetector, a reflector 20 is disposed behind the window 18' and it is preferably a parabolic reflector, although it can also be a spherical elliptical or cylindrical reflector.

In the embodiment as shown, the photodetector or photodiode 14 is configured to limit the field of view to the vicinity of the scan line as imaged by the reflector 20 thereon.

This embodiment is more compact than that of FIGS. 1A–1C, since all of the scanning elements are enclosed in the housing of the assembly 13. However, the reflector 20 and the photodiode 14 can be disposed on the side of assembly 13 or above or below assembly 13, as in scan module 10A.

Figure 3A:
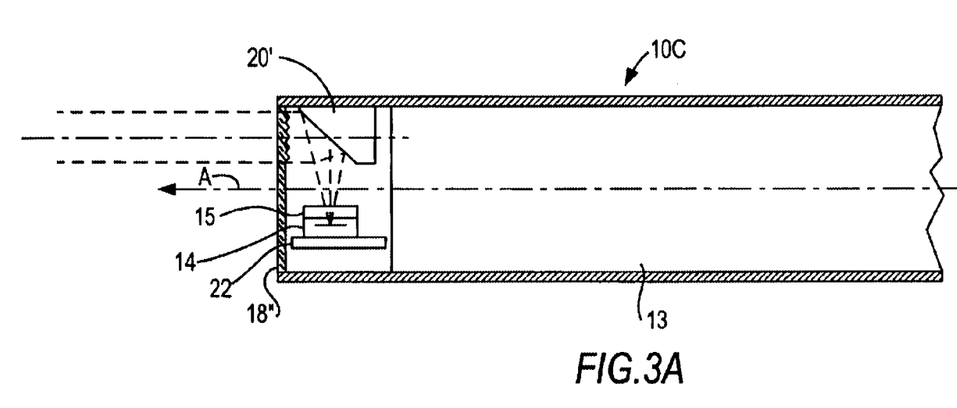
FIGS. 3A–3C are side, front and top views of a further embodiment of a scan module according to the present invention.
Figure 3B:
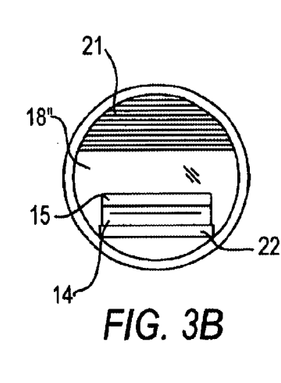
Figure 3C:
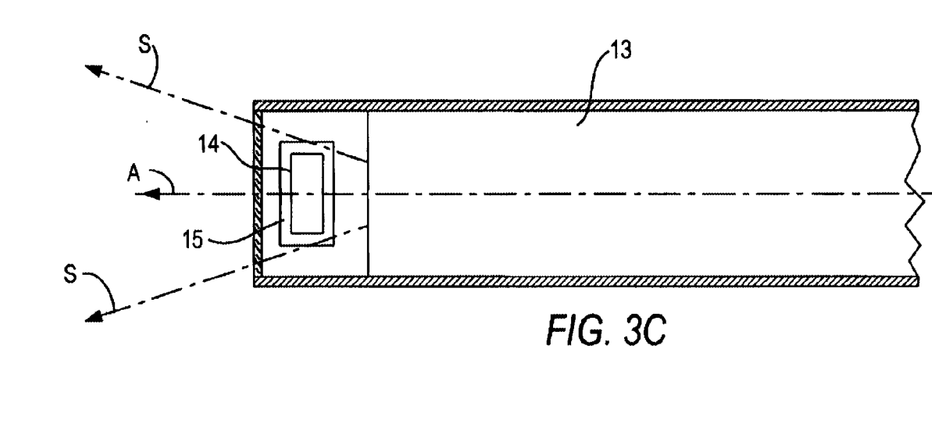

FIGS. 3A–3C illustrate a further embodiment of the present invention. In this embodiment, the photodiode 14 and filter 15 are mounted on a PC board 22 installed in front of the assembly 13. The plane of the photodiode is parallel to the axis A and thus a fold mirror 20' is provided to direct light reflected from a bar code. In order to limit the field of view of the photodetector to the scan line image, a fresnel collection lens 21 is provided, which is preferably part of window 18', but which can be separate therefrom. The lens can also be spherical or cylindrical, or it can be a conventional (non-fresnel) lens.

Figure 4A:
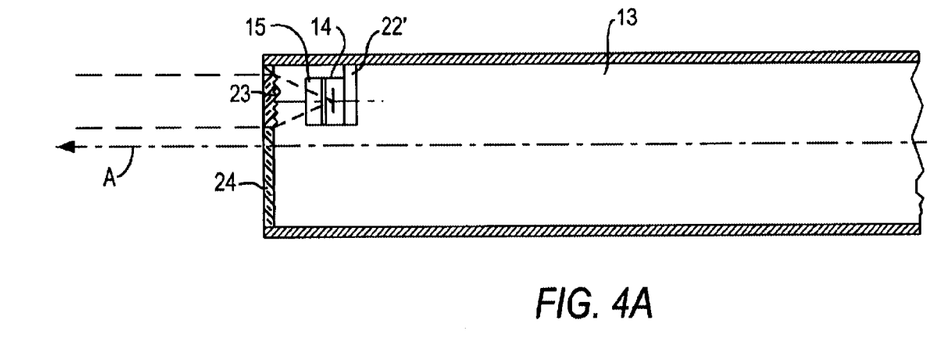
FIGS. 4A–4C are side, front and top views of still another embodiment of the scan module according to the present invention.
Figure 4B:
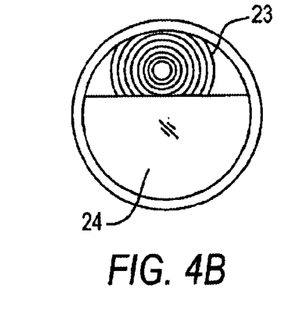
Figure 4C:
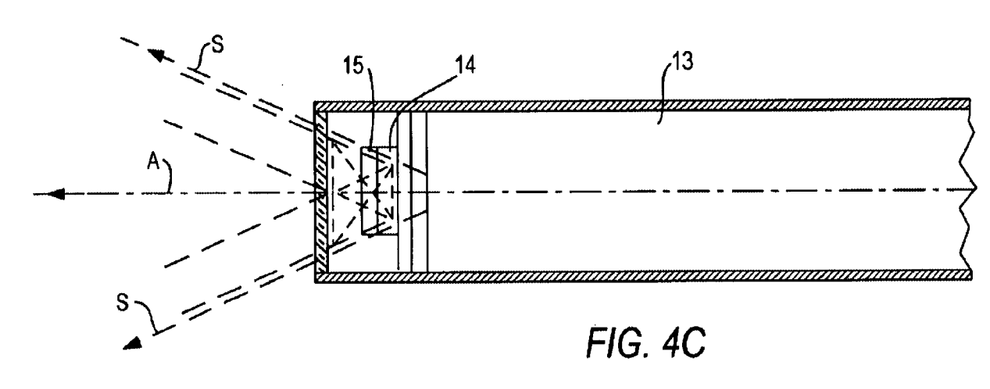

This embodiment is more compact than that of FIGS. 1A–1C , since all of the scanning elements are enclosed in the housing of the assembly 13. However, the reflector 20 and the photodiode 14 can be disposed on the side of assembly 13 or above or below assembly 13, as in scan module FIGS. 4A–4C illustrate a still further embodiment 10D of the invention. In this embodiment, the photodiode is again in front of the assembly 13, however the photodiode is facing in the axial direction A and has the filter 15 therewith and is mounted on a board 22'.

In this embodiment, the collection lens 23 is preferably spherical or cylindrical and is part of window 24, although it could also be separate therefrom.

Moreover, the photodiode has a width to match the scan line image formed by the collection lens 23.

This embodiment is more compact than that of FIGS. 1A–1C, since all of the scanning elements are enclosed in the housing of the assembly 13. However, the reflector 20 and the photodiode 14 can be disposed on the side of assembly 13 or above or below assembly 13, as in scan module 10A.

Instead of using the optics for restricting the field of view of the photodetector, ambient light can be distinguished from signal by pulsing the laser beam produced by the laser diode. The beam is pulsed at a frequency preferably greater than 5 times the highest frequency of the baseband signal. One would then, for example, use a bandpass or narrow band filter to separate the signal generated by reflected laser light from ambient (noise) light. For a hand held scanner working at 36 scans per second, the typical highest frequency of a baseband signal is approximately 30 kHz so that the beam is pulsed out at least 150 kHz and preferably about 450 kHz.

Figure 5:
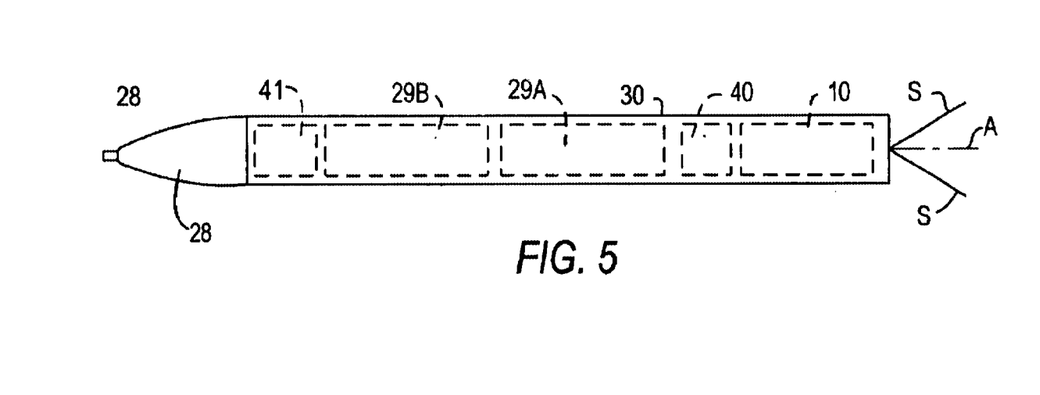
FIG. 5 is a pen scanner according to the present invention.

FIG. 5 illustrates an embodiment of the present invention wherein a pen housing 30 has any one of the modules 10A–10D referenced as 10 in FIG. 5, so that the scan lines S—S can be emitted from one end thereof. The module 10 includes all of the signal processing and decoding circuitry thereon in one or two or more printed circuit boards forming the housing of the module.

Also included in the pen housing is a writing element 28, which can be a retractable pen cartridge or fixed pen with a cap or the like, and batteries 29A, 29B which can be either replaceable or rechargeable AA or AAA batteries. Also included in the pen housing 30 is communications circuitry 40. The communications circuitry may be circuitry which controls the laser in the module 10 to emit a pulsed output to indicate data. It can also include an LED which can indicate successful decodes when decoding is being carried out and which can also communicate data via pulsing of the light beam (other optical interfaces such as IRDA can also be used and returning data can be received by scanner photodiode). The decode LED can be actuated to transmit data. The circuitry 40 can also be a wireless RF transceiver for communicating data to a host or terminal. The device also includes power management circuitry 41 which is connected to the other components and saves power by shutting off the scan module after a successful decode or a time-out period and/or by staggering the activation of the various components to reduce peak power draws. For example, the circuitry may first turn on a scan motor and let it come up to full speed before laser turn on. Similarly, laser turn on may be delayed until the circuitry has gone through its initiation routine. This will not only reduce overall power drain on the batteries, but will also minimize current spikes (instantaneous) current draw. This is important with small batteries that have high internal resistance.

Figure 6:
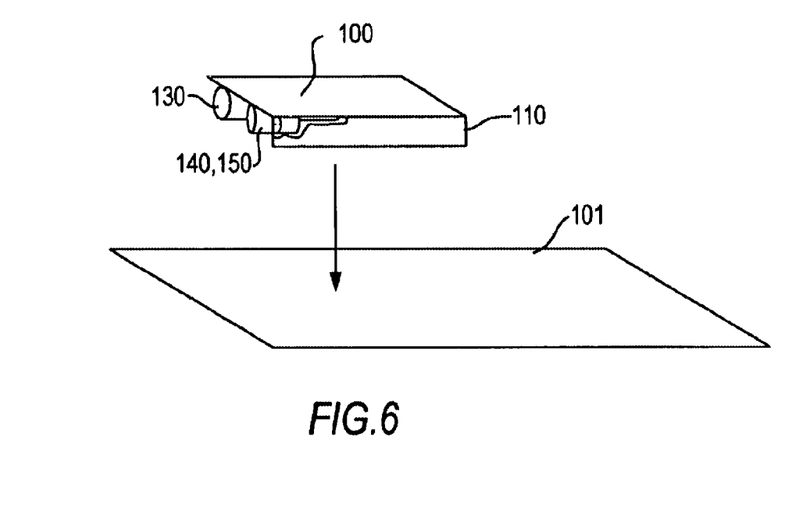
FIG. 6 is an illustration of another embodiment of a scan module in accordance with the present invention.

The components 10, 29A, 29B, 40 and 41 can also be used in a keychain or pendant form factor because of their compact size. FIG. 6 illustrates another embodiment of the present invention. In this embodiment, the module 100 can be any one of the scan modules 10A–10D discussed hereinabove, or it can be a retroreflective and/or non-axial scan module. The module housing includes a block 110 on which a laser scanner assembly 130 including a laser source and a moveable scan element, as well as photodetector 140 and collecting optics 150. The photodetector 140 generates a signal corresponding to light reflected from a dataform, such as a bar code, and this signal from the scan module is to be signal processed, such as by being amplified and digitized, and is thereafter decoded. This is carried out by signal processing and decoding circuitry.

In accordance with the present invention, the signal processing and decoding circuitry is preferably mounted on a printed circuit board 101, so that one need only mount the module block 110 to the printed circuit board to connect the output of the photodetector to the circuitry or to direct collected light to the photodiode mounted on the circuit board. Other signals for the module, for example, a motor drive signal, a motor feedback signal, a laser drive signal and a laser feedback signal, would also be connected. This embodiment is particularly advantageous where the printed circuit board 101 is the motherboard for another device, such as a cellular phone, a personal digital assistant, a computer terminal or the like. In this case, the motherboard 101 can be constructed with all of the electronics thereon for the scan module, and in order to add the scanning functionality to the device, one need only mount the module block with its supported components shown in FIG. 6 to the motherboard and make the connections therebetween.

Power management circuitry and communications circuitry can also be mounted on the motherboard to give additional functionality to the scan module.

The modules 10A–10D can be mounted in housings in a simple manner by the-use of a two screw mount disclosed in U.S. application Ser. No. 09/275,858, filed May 24, 1999, the disclosure of which is incorporated herein by reference.

Another advantage of the above disclosed systems is that they can be configured to provide "Optical AGC". This kind of system reduces the change of signal level associated with variations in distance between the symbol and the scanner. Normally the signal received by the collection optics falls off with the square of the distance, as the symbol moves away from the scanner. This can require the use of electrical automatic gain control (AGC) circuitry, or of complex digitizing circuitry that can accommodate signals of widely varying amplitudes. Use of an optical AGC can allow increased working range of a scanner without using either of these things, and optical AGC can usually be implemented without adding any cost to a collection system.

Figure 7A:
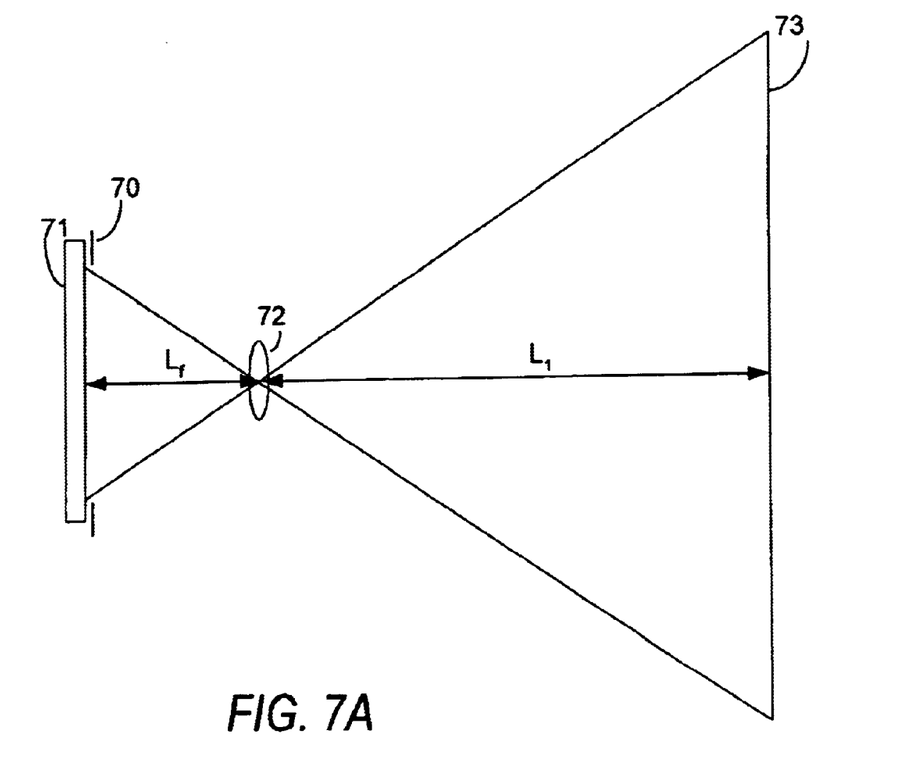
FIGS. 7A–7C illustrate optical AGC according to the present invention.
Figure 7B:
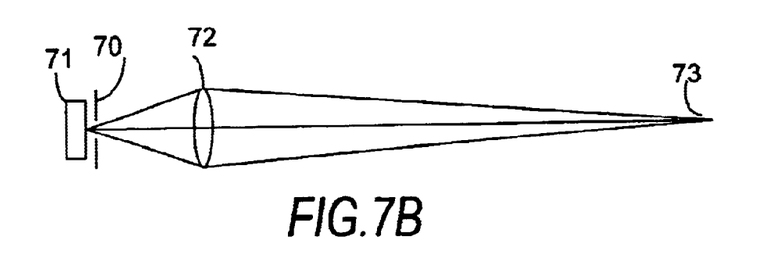
Figure 7C:
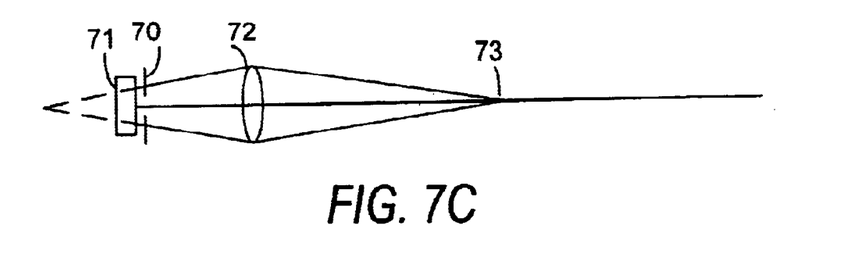

To get this advantage, as shown in FIGS. 7A–7C, it is merely necessary to focus the collection system so that the image of the scan line 73, on the detector 71 through aperture 70 is best when the symbol is far away from the scanner at $L_1$, for example, for systems described above, which have a useable range of around two to two and a half feet, the system might be focused about one to two feet out and the detector is positioned near the focal length of the lens $L_f$. FIG. 7A is a top view and FIG. 7B is a side view thereof. When a symbol is positioned closer than this, the image on the detector is out of focus, causing a blurry line, instead of a sharply defined line on the detector. As the symbol moves closer to the scanner, the blur increases until some of it falls on the masked area of the detector as shown in FIG. 7C. When the symbol is very close, most of the light falls on the masked area, throwing away more and more signal as the symbol comes closer to the scanner. This reduces the signal compensating for the otherwise increasing signal that would have occurred from bringing the symbol closer, maintaining a more even signal level throughout the working range. This optical AGC can be used with a spherical lens 72 or a cylindrical or elliptical lens.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A non-retroreflective axial scan module comprising:
   a light source for producing a pulsed light beam at a frequency greater than five times the highest frequency of a baseband signal;
   a scan element receptive of the light beam to provide a scanning light beam;
   a photodetector for receiving light from the scanning beam reflected by a dataform for producing a signal corresponding thereto;
   optics for restricting the field of view of the photodetector to the vicinity of a scan line formed by the scanning light beam on the dataform;
   and a compact housing for supporting the light source, scan element, photodetector and optics.

2. The scan module according to claim 1, wherein the optics is disposed in front of the photodetector.

3. The scan module according to claim 2, wherein the optics comprises a lens disposed at one side of the housing with the photodetector recessed from the front of the module.

4. The scan module according to claim 3, wherein the optics further comprises a slit aperture between the photodetector and the lens.

5. The scan module according to claim 3, wherein the photodetector is configured to match a general shape of an image of the scan line formed by the lens.

6. The scan module according to claim 5, wherein the photodetector is long and narrow.

7. The scan module according to claim 5, wherein the optics further comprises a slit aperture between the photodetector and the lens.

8. The scan module according to claim 2, further comprising an optical filter for the photodetector.

9. The scan module according to claim 1, wherein the optics comprises a fresnel lens.

10. The scan module according to claim 1, wherein the photodetector is disposed in front of the light source and the scan element.

11. The scan module according to claim 10, wherein the optics is disposed in front of the photodetector.

12. The scan module according to claim 11, wherein the optics comprises a lens disposed at one side of the housing with the photodetector recessed from the front of the module.

13. The scan module according to claim 11, wherein the optics further includes a slit aperture between the photodetector and the lens.

14. The scan module according to claim 11, wherein the photodetector is configured to match a general shape of an image of the scan line formed by the lens.

15. The scan module according to claim 14, wherein the photodetector is long and narrow.

16. The scan module according to claim 14, wherein the optics further comprises a slit aperture between the photodetector and the lens.

17. The scan module according to claim 11, further comprising a filter for the photodetector.

18. The scan module according to claim 10, wherein the optics comprises a fresnel lens or a conventional lens.

19. The scan module according to claim 18, further comprising a window for the scan element and wherein the lens is part of the window.

20. The scan module according to claim 10 wherein the photodiode is disposed perpendicular to the beam and wherein the optics comprises a lens and a fold mirror.

21. The scan module according to claim 20, wherein the lens is a fresnel lens.

22. The scan module according to claim 20, wherein the fold mirror is a cylindrical mirror.

23. The scan module according to claim 20, wherein the fold mirror is a spherical mirror.

24. The scan module according to claim 20, wherein the fold mirror is a parabolic reflector.

25. The scan module according to claim 20, wherein the field mirror is an elliptical mirror.

26. The scan module according to claim 20, wherein the optics further includes a slit aperture between the photodetector and the lens.

27. The scan module according to claim 20, wherein the photodetector is configured to match a general shape of an image of the scan line formed by the lens.

28. The scan module according to claim 27, wherein the photodetector is long and narrow.

29. The scan module according to claim 27, wherein the optics further includes a slit aperture between the photodetector and the lens.

30. The scan module according to claim 20, further including a filter for the photodetector.

31. The scan module according to claim 30, wherein the filter is a red window.

32. The scan module according to claim 1, wherein the photodiode is disposed perpendicular to the beam and wherein the optics comprises a lens and a fold mirror.

33. The scan module according to claim 1, wherein the housing comprises upper and lower walls each constituted by a printed circuit board and wherein at least one of the printed circuit boards have signal processing and decoding circuitry thereon receptive of the signal from the photodetector.

34. A pen scanner comprising a pen housing with a writing element at one end and the module according to claim 1 mounted in the pen housing to emit the scanning light beam from the other end.

35. The pen scanner according to claim 34, further comprising a power source in the pen housing.

36. The pen scanner according to claim 35, wherein the power source comprises at least one rechargeable battery.

37. The pen scanner according to claim 35, wherein the power source comprises at least one replaceable battery.

38. The pen scanner according to claim 34, further comprising wireless communications circuitry to output data from the scanning module.

39. The pen scanner according to claim 38, wherein the communications circuitry includes the light source.

40. The pen scanner according to claim 38, wherein the communications circuitry comprises a radio frequency transmitter.

41. The pen scanner according to claim 38, wherein the communications circuitry comprises a light emitting diode.

42. The pen scanner according to claim 41, wherein the communications circuitry includes the same photodetector used for reading bar codes.

43. A key chain scanner comprising a housing on a key chain or key fob with the module according to claim 1 mounted in the housing to emit the scanning light beam therefrom.

44. A pendant scanner comprising a pendant housing with the module according to claim 1, mounted in the pendant housing to emit the scanning light beam therefrom.

45. The scan module according to claim 1, wherein the housing comprises a block mounting the light source, scan element, photodetector and optics and wherein the block is mountable on a printed circuit board having signal processing and decoding circuitry thereon to output the signal from the photodetector thereto.

46. The scan module according to claim 45, wherein the printed circuit board is the motherboard of another device utilizing a scanning input.

47. The scan module according to claim 1, further comprising decode circuitry and power management circuitry for staggering the activation of the light source, the scan element and the decode circuitry.

48. The scan module according to claim 47, wherein the power management circuitry turns off the light source and scan element upon a successful decode.

49. The scan module according to claim 48, wherein the power management circuitry turns off all other scanner circuitry after decode.

50. A scan module comprising:
   a light source for producing a pulsed light beam at a frequency greater than five times the highest frequency of a baseband signal;
   a scan element receptive of the light beam to provide a scanning light beam;
   a photodetector for receiving light from the scanning beam reflected by a dataform for producing a signal corresponding thereto;
   collection optics for directing reflected light to the photodetector;
   and a block for supporting the light source, scan element, photodetector and collection optics;
   wherein the module has a volume of less than about one cubic inch;
   and wherein the block is mountable on a printed circuit board having signal processing and decoding circuitry thereon to output the signal from the photodetector thereto.

51. The scan module according to claim 50, wherein the printed circuit board is the motherboard of another device utilizing a scanning input.

52. A non-retroreflective axial scan module comprising:
   a light source for producing a light beam, wherein the light beam is pulsed at a given frequency greater than five times the highest frequency of a baseband signal in order to reduce sensitivity to ambient light;
   a scan element receptive of the pulsed light beam to provide a scanning light beam;
   a photodetector for receiving light from the scanning beam reflected by a dataform for producing a signal corresponding thereto;
   and a compact housing for supporting the light source, scan element and photodetector.

53. A non-retroreflective axial scan module comprising a light source for producing a pulsed light beam at a frequency greater than five times the highest frequency of a baseband signal;

a scan element disposed receptive of the light beam to provide a scanning light beam;

a photodetector for receiving light from the scanning beam reflected by a dataform for producing a signal corresponding thereto;

optics for focusing the light reflected by the dataform on the photodetector, wherein the optics are focused such that an image of a scan line on the dataform is focused when the dataform is at a given distance approximately at a maximum usable distance for the scan module and wherein the image grows larger than an available surface of the photodetector when the dataform is moved closer to the scan module;

and a compact housing for supporting the light source, scan element, photodetector and optics.

54. The scan module according to claim 53, wherein the optics is a spherical lens.

55. The scan module according to claim 53, wherein the optics is a cylindrical lens.

56. The scan module according to claim 53, wherein the optics is a parabolic reflector.

57. The scan module according to claim 53, wherein the optics is a elliptical lens.

* * * * *